Feb. 20, 1923.
N. L. LIEBERMAN
FLUID GAUGE
Filed June 12, 1920
1,446,439
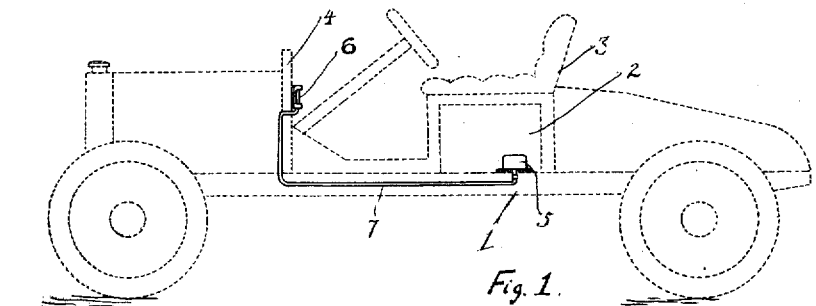
Fig. 1.
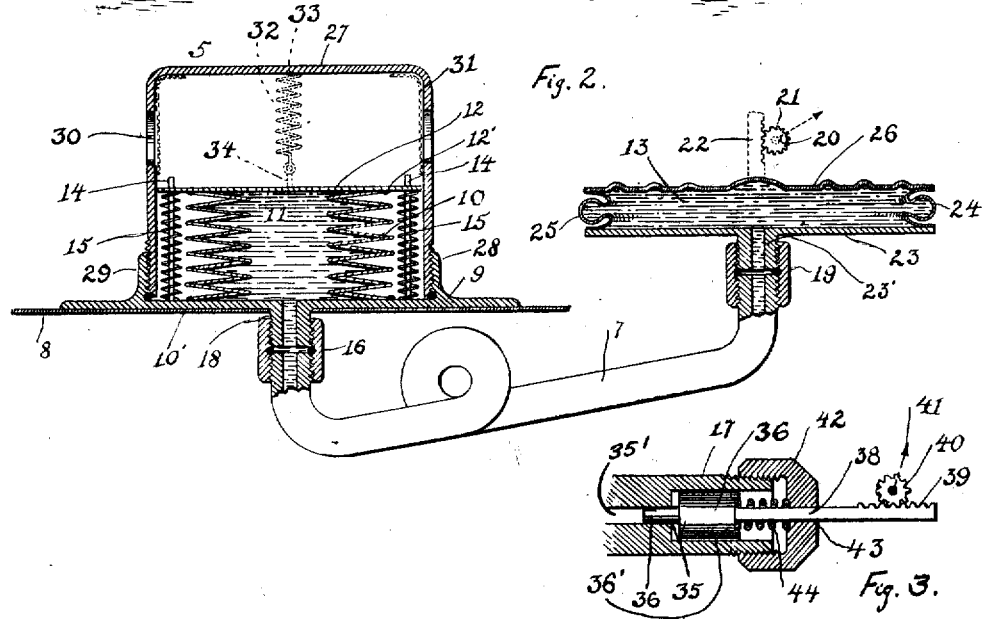
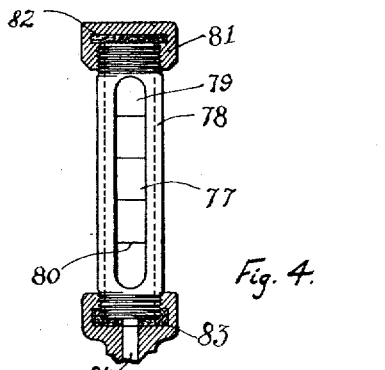
Inven.
NATHAN L. LIEBERMAN
By his Attorney
Morris Hirsch Patented Feb. 20, 1923.

1,446,439

UNITED STATES PATENT OFFICE.

NATHAN L. LIEBERMAN, OF NEW YORK, N. Y.

FLUID GAUGE.

Application filed June 12, 1920. Serial No. 388,533.

*To all whom it may concern:*

Be it known that I, NATHAN L. LIEBERMAN, a citizen of the United States, and resident of New York city, in the county of New York and State of New York, have invented certain new and useful Improvements in Fluid Gauges, of which the following is a specification.

This invention relates primarily to liquid gauging apparatus and more particularly to apparatus for quickly ascertaining the amount of liquid in a container not conveniently accessible. The apparatus has its preferred application for indicating the amount of fuel in the tank of a motor vehicle.

One of the objects of the invention is to provide apparatus of the above type which shall be of simple and inexpensive construction and which shall be reliable in action.

Another object is to provide apparatus of the type mentioned which shall be easy to install in any relation in which it may be used.

A feature of the invention is the provision of a member, preferably a diaphragm subjected to and displaceable by the head of liquid in a tank, and an indicator upon the dashboard or at any other convenient place, a simple transmitting conductor being employed to connect a member and the indicator to cause the latter to show a reading corresponding to the displacement of the member.

The transmitting conductor referred to according to one desirable embodiment comprises a pipe or tube filled with preferably an incompressible liquid, the said liquid being displaced substantially in proportion to the head of fuel or other liquid in the tank, to actuate the indicator to a substantially proportional extent.

To obtain accuracy and sensitiveness, I prefer to provide a protruding resilient head at the end of the transmitting conductor filled with the incompressible fluid and in liquid tight communication with the pipe, liquid tight communication with the pipe, said head being constructed and arranged for axial diminution by the force induced by the fluid to be gauged. In the preferred specific embodiment, the head comprises a cylindrical flexible side wall closed at one end, an appropriate spring or springs maintaining said flexible side wall distended, the said construction acting as a pressure base, the end wall thereof being depressed against the resistance of said springs substantially directly in proportion to the magnitude of the head of liquid to be gauged; the cylindrical wall collapsing correspondingly without undue strain thereon and without escape of the confined incompressible liquid.

According to another preferred feature, the gauge is actuated from an element thereof submerged under and subjected to the static pressure of the depth of fluid being gauged, and preferably bodily displaceable thereby.

In the accompanying drawings in which are shown some of the various possible embodiments of the several features of this invention, Fig. 1 is a view of a motor vehicle showing one manner in which my gauge may be installed, Fig. 2 is a view partly in longitudinal section of one embodiment of my gauge, Fig. 3 is a detail view of a modified form of indicator unit and Fig. 4 is a further modified embodiment of indicator.

Referring now to the drawings and particularly to Fig. 1 there is shown at 1 the dotted outline of an automobile, the fuel tank 2 being indicated by way of example as under the seat 3 and the dashboard being shown at 4. Associated with the fuel tank in such manner as to be subjected to the head of liquid therein, there is a gauge element 5 to be described more fully below which includes a part that will be displaced to an extent substantially proportional to the head of liquid thereabove. Upon the dashboard there is shown by way of example a liquid level indicator 6, and a transmitting conductor which may comprise a pipe or tube 7 of small diameter connects the gauge element with the indicator. The tube 7 is preferably of a material that can be easily bent to round corners as for instance at the junction between the floor and the dashboard as shown in the drawings. Fig. 1 merely shows the relative disposition of the three constituent parts of my preferred form of gauges upon an automobile, comprising briefly a member 5 subjected to the head of fuel which I will therefore name "head unit," an indicator unit 6 and a transmitting conductor 7 between the latter two elements.

In Figs. 2, 3, and 4 I have shown the details of various desirable forms of head units, indicator units and transmitting conductors, associated with each other in various desirable ways, it being understood that in each case the head unit is to be subjected to the head of fuel in the tank, the tank being in any desirable place upon the vehicle, that the indicator unit is to be placed at any convenient part of the vehicle, preferably upon the dashboard and that the transmitting conductor is to connect the head unit and the indicator unit substantially as shown in Fig. 1.

The specific gauge or head unit element illustratively indicated in general outline at 5 in Fig. 1 appears on a larger scale and in detail in Fig. 2. Referring to Fig. 2 the floor of the fuel tank is shown at 8 and mounted thereon is a base element 9 for the unit. A flexible metal diaphragm 10 of bellows type rests upon the base 9 and has the periphery of its lowermost end secured thereto preferably by soldering as at 10', a cover plate 12 closing the uppermost end of the diaphragm and being secured thereto preferably by soldering as at 12'. The diaphragm 10 together with its base and cover 12 thus constitute a compartment 11 which is liquid tight against entry of fuel from the tank. A plurality of guide rods 14 preferably extend upwardly from the base member 9 and through the plate 12, and are by preference each encircled by a coil spring 15, the springs opposing compression of the diaphragm.

By preference a metal hood 27 extends over the head unit compartment 11 within the gasoline tank, the said hood being preferably threaded at its lower end 28 into a flange 29 formed integral with the base 9. Lateral openings 30 are provided in the hood 27 preferably above the cover plate 12 and fine mesh wire screens 31 preferably extend over the openings 30 either inside or outside the hood 27, said screen elements being secured in place by any convenient means not shown. The screens serve to prevent excessive surging of the fuel and also for straining out solid impurities.

In dotted lines is shown at 32 a spring arrangement alternative to the springs 15 for resisting compression of the bellows diaphragm 10. This spring is shown centrally secured at one end 33 to the closed end of the hood 27 and centrally at its other end 34 to the cover plate 12 of the head unit compartment 11.

In the preferred form of apparatus, instead of the liquid level indicator 6, I prefer to employ an indicator 20 consisting of a pointer operated by a pinion 21 through a rack 22. In this embodiment there is provided an indicator unit compartment 13 comprising a rigid base 23, a diaphragmatic cover 26 preferably corrugated parallel thereto, the latter two elements being connected by a flexible metal side wall 24. The wall 24 is sinusoidal in cross section as shown in the drawings and includes by preference a bead portion 25, the largest diameter of which is no greater than that of the base 23 and the cover 26, said bead having a width roughly in the neighborhood of half the height or depth of the compartment. The rack 22 is preferably secured centrally to the outside of the diaphragmatic cover 26.

The tube 7 is in communication at one end with the interior of the head unit compartment 11 and for this purpose a union 16 is preferably provided which connects the tube end to a nipple 18 formed integrally with the base 9 and projecting through a corresponding opening 19 in the bottom of the tank. The opposite end of the tube 7 is connected by a similar union 19 to a similar nipple 23' integral with indicator compartment base 23. The pipe or tube 7 as above noted is preferably of readily bendable material so it can easily round corners upon the vehicle body when installed between a tank and an indicator at widely separated parts of the vehicle. The material of the tube is however rigid in cross-section so that it maintains a constant capacity under the conditions of use.

The gauge shown in Fig. 2 when applied to use is preferably filled with an incompressible fluid; this preferably an oily liquid such as glycerine, the liquid completely filling the head unit compartment 11, the entire length of the tube 7 and the indicator unit compartment 13.

Prior to the installation of the device, the head unit, the indicator unit and the connecting pipe or tube are preferably separately filled with the incompressible liquid, closure caps (not shown) preferably being employed to maintain the liquid therein. The two units are separately applied one to the tank and the other adjacent the dashboard. The conducting pipe is then applied, the two ends being connected to the head and indicator units by the means shown, after removal of the closure caps.

With my gauge installed, when the fuel is poured into the tank 2, the hood 27 acts as a baffle plate to prevent excessive fluid impact strains upon the diaphragm element. After the fuel rises above the lower level of openings 30 it enters the interior of the hood 27 through the straining screens 30 and rises over the exterior of head unit compartment 11. The head of fuel upon the cover plate 12 will act to compress the bellows diaphragm against the resistance of springs 15 or of spring 32 to an extent proportional to said head and in the process of this compression it will force out some of the incompressible liquid therein through the tube 7 causing an equal amount of the incompressible liquid within tube 7 to enter compartment 13. The entry of liquid into compartment 13 causes a bulging of the diaphragm 26 away from the base 23 and the sinusoidal side wall 24 may also expand somewhat in this action. This displacement is imparted to the rack 22 which moves longitudinally for proper adjustment of the indicator pointer by the action of pinion 21. The scale of the indicator (not shown) is preferably calibrated in an obvious manner to give a reading corresponding to the amount of fuel in the tank. The sinusoidal side wall 24 acts primarily as a shock absorber to damp the oscillation of the indicator pointer as a result of the vibration of the moving vehicle.

Briefly stated the head of fuel deflects one diaphragm, and the consequent shifting of the liquid within the gauge causes a corresponding deflection of the diaphragm forming the dynamic part of the indicator unit. In effect the entire gauge constituting the head compartment, the indicator compartment and the connecting tube constitute a single liquid tight chamber filled with incompressible fluid, this chamber having flexible walls at opposite sides and being rigid elsewhere, so that any displacement of one flexible wall must bring about a corresponding displacement of the other flexible wall.

In Fig. 3 is shown an alternative form of indicator unit which may be substituted for that of Fig. 2. This unit comprises a cylinder 17 having a small bore 35′ preferably of the same diameter as the internal diameter of tube 7 and in communication with said tube, a relatively larger bore 36′ communicating therewith. A two-diameter piston has a part 35 fitting in bore 35′ and a larger part 36 fitting in bore 36′. Integral with the end of the larger piston there is a stem 38 upon the outer end of which is formed a rack 39 meshing with a pinion 40 for operating the indicator pointer 41. A closure cap 42 is preferably threaded upon the end of the cylinder, the stem 38 passing through a hole 43 in said cap. A coil spring 44 encircles said stem and presses at one end against the cover 42 and at the other against the cylinder 37.

In operation it will be understood that the fluid pressure exerted upon the end of piston 36 will cause the same to advance against the compression of spring 44 to move the pointer. As fuel is drawn from the tank the pressure upon the piston is diminished, and spring 44 pushes the piston back correspondingly causing the rack to correspondingly move the pointer through the pinion 40 for giving the appropriate indicator reading.

Although I have shown in Figs. 1 and 2 an arrangement in which the tank element of my gauge rests within and upon the bottom of the fuel tank, it will be understood that the said element might be on the outside of the tank and in communication therewith.

It will be apparent that the indicator unit compartment 13 could be used as a head unit compartment. It will be seen that my gauge is applicable regardless whether the indicator is higher or lower in elevation than the fuel tank.

In the application of gauges of my invention of the type shown to pressure fluid feed systems it is desirable to provide an air by-pass tube as shown in dotted line from the gasoline tank to the top of the indicator compartmnt in Fig. 2 or to the end of the piston in Fig. 3 nearest the indicator. By this means fluctuations in the air pressure within the tank transmitted to the head compartment would be compensated for, the indicator motive element receiving merely the net pressure due to the head of fuel.

The liquid level gauge upon the dashboard in Fig. 1 is shown in Fig. 4 and comprises by preference a glass or quartz tub 77 enclosed in a metallic tube 78 having an opening 79 through which the level of the liquid within the indicator may be seen, there being preferably graduations 80 either upon the metallic or the glass tube. A cap 81 is threaded upon the free end of the metallic tube 78, a gasket 82 forming a liquid tight connection. A similar closure 83 is provided at the lower end of the liquid level in connection with the tube 7.

The volume of the liquid level between extreme graduations is preferably equal to the volume displaced from the head unit when the gasoline tank is full. The head unit compartment and the connecting tube are filled with a quantity of liquid sufficient to reach the "empty" registration upon the liquid level. With the parts related as described the level will give an accurate indication of the quantity of fuel in the tank.

It will thus be seen that I have provided a liquid gauge, the readings of which are dependable, whether the fuel is fed by gravity or by pressure. The head unit, indicator unit and connecting tube constituting a single completely closed chamber as heretofore pointed out, no foreign matter such as air, water or fuel can enter to impair the accuracy of the instrument. It should further be noted that by transmitting the pressure due to the head of fuel through a body of incompressible fluid, I avoid the inaccuracy that may arise in the use of compressible fluids, such as air for similar purposes.

Although as above indicated the invention has its preferred application to the gauging of fuel in the tank of a motor vehicle it will be understood that the invention may be applied to advantage to stationary tanks or reservoirs generally. Broadly, my gauge has its preferred application to any system in which the registering device is at a distance from the fluid to be gauged. It will, furthermore, be apparent that my gauge is applicable not only as a liquid gauge but as fluid gauge broadly for measuring the quantity of pressure of liquids, gases or vapors.

I claim:

1. A gauge comprising a closed chamber containing a fluid material and including a head, the end wall of said head being subjected to a force induced by the fluid to be gauged and bodily movable thereby, to cause a displacement of fluid from said head by the diminution of the axial length thereof, to an extent substantially proportional to said force, another part of said chamber having an indicator associated therewith responding to the displacement of said fluid material.

2. A gauge comprising a closed chamber filled with an incompressible liquid, said chamber including a protruding resilient head subject to a force induced by the fluid to be gauged, having its end wall bodily movable thereby, a fixed rigid tube in liquid-tight communication with said head at one end, and a second displaceable head, having an indicator in liquid-tight communication with the other end of said tube, and actuated through the incompressible liquid by the displacement of said first head to operate the indicator.

3. A gauge comprising a closed chamber filled with a liquid and retained against bodily displacement, said chamber including an end wall subjected to force induced by the fluid to be gauged, and bodily movable thereby, and a flexible liquid-tight side wall portion adjacent said end wall, diminishing its axial dimension in proportion to the force upon said end wall for corresponding bodily displacement of the latter, said chamber having a second movable wall portion responding to said end wall displacement and an indicator actuated by said second movable wall portion.

4. A liquid gauge comprising a closed chamber filled with a substantially incompressible fluid, said chamber including a head protruding into a container of liquid to be gauged, said head having an end wall subject to pressure of liquid thereabove, a side wall portion of said head yieldable under said pressure for diminution of its axial dimension, to permit said pressure to bodily depress said end wall and thus eject fluid from said head, said chamber having a second wall portion external of said container and displaceable by pressure from said ejected fluid, and an indicator actuated by displacement of said second end wall.

5. In combination, a tank of liquid, a gauge therefor comprising a compartment seated upon the bottom of said tank, the upper end of said compartment comprising a head including a collapsible side wall, diminishing in an axial direction with increase of pressure due to the contents of the tank, to cause a displacement of the transmitting fluid from said compartment, a tube communicating at one end with the interior of said compartment and projecting from said tank, a second compartment in communication with the other end of said tube, said second compartment including a flexible diaphragm, and an indicator associated with the latter.

6. A liquid gauge comprising a rigid fixed pipe, a cylindrical flexible side wall portion fixed at one end with respect to said pipe and in liquid-tight communication therewith, a pressure base constituting a closure for said side wall portion, spring means urging said flexible wall to extended position, a displaceable head closing the opposite end of said pipe, an incompressible liquid completely filling the closed chamber formed of said pipe, said side wall element, said base and said head, whereby said base will be depressed in proportion to the pressure of fluid to be gauged to correspondingly collapse said flexible wall against the resistance of said spring, thereby to displace the liquid in the interior of the casing and to correspondingly displace said head and indicating means actuated by said head.

7. In combination, a fluid container, a transmitting head constituting part of the retaining wall for the fluid in said container, said head including a flexible metallic element protruding into said container, whereby said flexible element will yield in the direction of the fluid pressure in the container, and diminish the extent of protrusion of said head.

8. A gauge including a first compartment having a part of its wall in the form of a flexible diaphragm, a tube communicating at one end with said compartment, a second compartment in communication with the other end of said tube, said second compartment comprising a fixed plate, a diaphragm, and a flexible metal wall sinuous in cross-section connecting said elements with a liquid tight joint, a body of fluid filling said compartments and said connecting tube, said second compartment having an indicator associated therewith.

9. A gauge including a first compartment having a part of its wall in the form of a flexible diaphragm, a tube communicating at one end with said compartment, a second compartment in communication with the other end of said tube, said second compartment comprising a fixed plate, a diaphragm, and a flexible metal wall connecting said elements with a liquid-tight joint, a body of fluid filling said compartments and said connecting tube, said second compartment having an indicator associated therewith.

10. In a liquid gauge, a compartment to be seated upon the bottom of the tank, the contents of which are to be gauged, said compartment being filled with a fluid and including an upper wall portion in the form of a flexible diaphragm, and a hood resting upon the bottom of said tank over said diaphragm and provided with lateral openings, the upper wall of said hood constituting a baffle plate.

11. The combination of claim 10 in which the lateral openings are above the uppermost portion of said diaphragm.

12. In a liquid gauge, in combination, a compartment, including a flexible metal diaphragm of the bellows type, and a pair of walls closing the ends of said bellows and having a fluid tight connection therewith, said compartment being fixed near the bottom of the tank the contents of which are to be gauged, a tube communicating at one end with the interior of said compartment, an indicator at the other end of said tube, and an incompressible fluid completely filling said compartment and said tube.

13. In a liquid gauge, in combination, a compartment having a bottom seated upon the bottom of the tank the contents of which are to be gauged, a flexible metal diaphragm of the bellows type rising from said bottom and constituting the side wall of said compartment, a closure plate for said compartment having a liquid tight connection with the upper end of said bellows, a tube communicating with a hole in the bottom of said compartment, an indicator connected to the other end of said tube, and a liquid filling said compartment and said tube.

14. In a liquid gauge, in combination, a compartment having a bottom seated upon the bottom of the tank the contents of which are to be gauged, a flexible metal diaphragm of the bellows type rising from said bottom and constituting the side wall of said compartment, a closure plate for said compartment having a liquid tight connection with the upper end of said bellows, guide rods extending upwardly from said bottom and through said closure plate, an indicator, and means communicating with the interior of said bellows for actuating the indicator.

15. The combination of claim 14 in which coil springs encircle the guide rods to offer opposition to the compression of the bellows.

16. In a liquid gauge, in combination, a compartment having a bottom seated upon the bottom of the tank the contents of which are to be gauged, a flexible metal diaphragm of the bellows type rising from said bottom and constituting the side wall of said compartment, a closure plate for said compartment having a liquid tight connection with the upper end of said bellows, means to resist compression of said bellows, and a hood rising from the bottom of said tank and encircling said bellows and provided with lateral openings, the upper wall of said hood constituting a baffle plate.

17. A gauge comprising a closed chamber filled with a liquid, said chamber including a flexible side wall portion, and means including an end wall closing said side wall portion subjected to force induced by the fluid being gauged and bodily displaceable thereby to diminish the axial dimension of said side wall portion substantially in proportion to the pressure of said fluid, said chamber having a second movable wall portion responding to the displacement of said end wall, an indicator actuated by said second movable wall portion.

18. A gauge comprising a chamber containing a fluid material and including a head with a yielding side wall, and means having a part submerged under and subjected to the static pressure of the depth of fluid being gauged and bodily displaceable thereby, said means constituting an end closure wall for said head bodily movable by said static pressure to cause a displacement of fluid from said head by the diminution of the axial length thereof, to an extent substantially proportional to said pressure, another part of said chamber having an indicator associated therewith actuated by the displacement of said fluid material.

19. A gauge comprising a chamber filled with an incompressible liquid, said chamber including a protruding resilient side wall portion, means having a part submerged under and subjected to the static pressure of the depth of liquid being gauged, said means constituting an end closure for said resilient side wall portion bodily movable by said static pressure, a fixed rigid tube in liquid-tight communication with the interior of said side wall portion at one end, and a second displaceable head in liquid-tight communication with the other end of said tube, and actuated through the incompressible liquid by the displacement of said first head and an indicator connected to said second displaceable head.

20. A gauge comprising a closed chamber filled with a liquid and retained against bodily displacement, said chamber including an end wall subjected to the head of fluid to be gauged, and bodily movable thereby, and a flexible liquid-tight side wall portion adjacent said end wall, diminishing its axial dimension in proportion to the force upon said end wall for corresponding bodily displacement of the latter, said chamber having a second movable wall portion responding to said end wall displacement and an indicator connected to said second movable wall and actuated thereby.

21. As an article of manufacture, in combination, a rigid fixed pipe, a flexible side wall portion fixed at one end with respect to said pipe and in fluid-tight communication therewith, means including a pressure base constituting a closure for said side wall element, said means having a part submerged under and subjected to the static pressure of the depth of fluid being gauged and bodily displaceable thereby in a direction to collapse said side wall, a displaceable member closing the opposite end of said pipe, fluid completely filling the closed chamber formed of said pipe, said side wall element, said pressure base, and said displaceable member, whereby upon exerting pressure on said base, said wall will yield and said pressure base will be displaced substantially in proportion to the weight, thereby to displace the fluid in the interior thereof and to correspondingly actuate said head and means operated by said head for indicating the magnitude of the pressure.

Signed at New York, in the county of New York and State of New York, this 11th day of June, A. D. 1920.

NATHAN L. LIEBERMAN.